United States Patent
Gallina

(10) Patent No.: US 7,411,698 B2
(45) Date of Patent: Aug. 12, 2008

(54) METHOD AND DEVICE FOR DETECTING A COLOR CAST IN AN IMAGE

(75) Inventor: Paolo Gallina, Turin (IT)

(73) Assignee: Telecom Italia S.p.A., Milan (IT)

( * ) Notice: Subject to any disclaimer, the term of this patent is extended or adjusted under 35 U.S.C. 154(b) by 966 days.

(21) Appl. No.: 10/495,574

(22) PCT Filed: Nov. 7, 2002

(86) PCT No.: PCT/IT02/00704

§ 371 (c)(1),
(2), (4) Date: May 14, 2004

(87) PCT Pub. No.: WO03/045050

PCT Pub. Date: May 30, 2003

(65) Prior Publication Data

US 2005/0008222 A1     Jan. 13, 2005

(30) Foreign Application Priority Data

Nov. 19, 2001    (IT)   .......................... TO2001A1080

(51) Int. Cl.
*H04N 1/60* (2006.01)
*G03F 3/08* (2006.01)
*G06K 9/00* (2006.01)
*G06K 9/40* (2006.01)

(52) U.S. Cl. ........................ 358/1.9; 358/518; 358/520; 358/522; 382/162; 382/167; 382/168; 382/172; 382/275

(58) Field of Classification Search .................. 358/1.9, 358/518, 520, 522, 162, 167, 168, 172, 275
See application file for complete search history.

(56) References Cited

U.S. PATENT DOCUMENTS

| | | | | |
|---|---|---|---|---|
| 5,420,704 A * | 5/1995 | Winkelman | ................ | 358/520 |
| 5,495,428 A * | 2/1996 | Schwartz | .................... | 382/164 |
| 5,748,802 A * | 5/1998 | Winkelman | ................ | 382/271 |
| 6,104,830 A * | 8/2000 | Schistad | .................... | 382/167 |
| 6,377,702 B1 * | 4/2002 | Cooper | ...................... | 382/167 |
| 6,683,982 B1 * | 1/2004 | Kohn | ........................ | 382/167 |
| 6,724,422 B1 * | 4/2004 | Werner | ...................... | 348/187 |
| 6,788,813 B2 * | 9/2004 | Cooper | ...................... | 382/167 |
| 7,023,580 B2 * | 4/2006 | Zhang et al. | ................ | 358/1.9 |
| 7,184,080 B2 * | 2/2007 | Kehtarnavaz et al. | .... | 348/223.1 |

FOREIGN PATENT DOCUMENTS

EP      0 647 060      4/1995

OTHER PUBLICATIONS

Gasparini F et al: "An Innovative Algorithm for Cast Detection" Proceedings of the SPIE, SPIE, Bellingham, VA. US, vol. 4672, Jan. 21, 2002, pp. 280-283, XP008013723.

* cited by examiner

*Primary Examiner*—Kimberly Williams
*Assistant Examiner*—Charlotte M. Baker
(74) *Attorney, Agent, or Firm*—Venable LLP; Robert Kinberg; Steven J. Schwarz

(57) ABSTRACT

Given an image converted into a chromatic space (101), a method is used for identifying a color cast (i.e. a dominant color), through statistical analysis (105) of the distribution on an color plane of the chromatic space of the color histogram of a region of the image's near neutral objects, said region being defined in such a way as to include a significant percentage of the starting image.

6 Claims, 8 Drawing Sheets

METHOD AND DEVICE FOR DETECTING A COLOR CAST IN AN IMAGE

This application is a National Stage application of co-pending PCT application PCT/IT02/00704 filed Nov. 07, 2002, which was published in English under PCT Article 21(2) on May 30, 2003, which claims the benefit of Italian application Serial No. TO2001A001080 filed Nov. 19, 2001. These applications are incorporated herein by reference in their entireties.

TECHNICAL FIELD

The invention relates to electronic image processing.

BACKGROUND ART

More specifically, the invention concerns a method for determining the presence of a color cast in an image, without having any a priori knowledge of the characteristics of the objects of the image reproduced.

The images may be generated by a video camera, or by equipment for the production of scientific or topographical images or images designed for medical diagnoses, by a camera for photographs, and the like.

The same images may also be displayed on a monitor and subsequently printed by means, for example, of an ink jet printer.

A color cast in an image is the deviation of the colors of a photograph from those of the original image. In studying the properties of an image, it is fundamentally important to be able to identify the presence of a color cast, which may have different origins: it may for instance be introduced by particular lighting conditions or by the image acquisition and transmission process and therefore be of artificial origin, or it may be a peculiar characteristic of the image, as in the case of a photograph taken at dusk or under water. In any case, identifying the cast makes subsequent correction of the image possible, so that a result more faithful to the original image is obtained.

DISCLOSURE OF THE INVENTION

A first object of this invention is that of detecting a color cast in an image.

A second object is that of obtaining a method that possesses high speed computing.

A third object is that of performing chromatic analysis of the image on a considerably reduced dot sample with respect to the original image.

A fourth object is that of obtaining a method independent of the initial datum type.

A fifth object is that of detecting the color cast of an original image without having any a priori knowledge of the characteristics of the objects reproduced.

The above objects are achieved by means of a method for detecting a color cast in an image, characterized as defined in the main claims.

These and other objects, characteristics and advantages of the invention shall become clear from the following description of a preferred embodiment, provided by way of non-restricting example, with reference to the accompanying drawings.

BRIEF DESCRIPTION OF DRAWINGS

FIG. 7b—Represents the equivalent circle corresponding to the histogram of FIG. 7a;

FIG. 8b—Represents the equivalent circle corresponding to the histogram of FIG. 8a;

FIG. 9b—Represents the equivalent circle corresponding to the histogram of FIG. 9a;

FIG. 10b—Represents the equivalent circle corresponding to the histogram of FIG. 10a;

FIG. 11b—Represents the projection on the plane ab of the histogram of FIG. 11a;

FIG. 12b—Represents the projection on the plane ab of the histogram of FIG. 12a;

BEST MODE FOR CARRYING OUT THE INVENTION

In the following a method is described, according to this invention, capable of detecting a color cast in an image, preferably though not exclusively digital type. To perform chromatic analysis, the image is converted into a chromatic space, for example into the color space CIEL*a*b*. The color space CIEL*a*b* is widely known in the image processing sector art, and will not therefore be described in detail herein.

The option to convert the image into the space CIEL*a*b* is justified by the fact that the distance between the colors, quantified in this space, corresponds extremely well to the distances between the same colors as perceived by our sight system.

Figure 1:
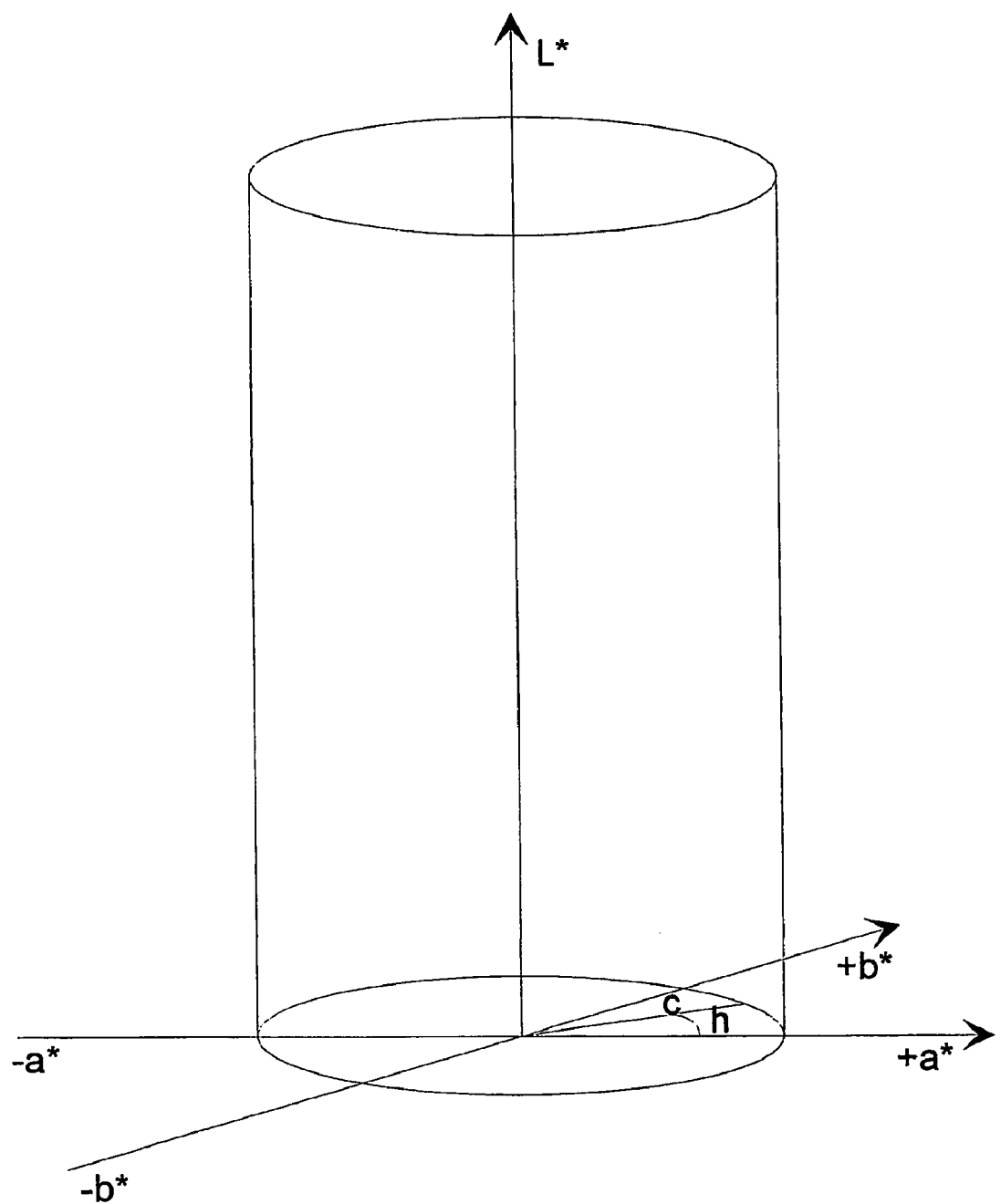
FIG. 1—Represents a graph of the color space CIEL*a*b*.

FIG. 1 illustrates the color space CIEL*a*b*, where, for the colors that are not auto illuminated, a* is between −80 (green) and +120 (red), b* is between −80 (blue) and +120 (yellow), while the luminance values L range from L=0 for absolute black (with a*=0 and b*=0) to L=100 for reference white (with a*=0 and b*=0); also depicted are the chrome radius c, and the hue angle h.

Figure 2:
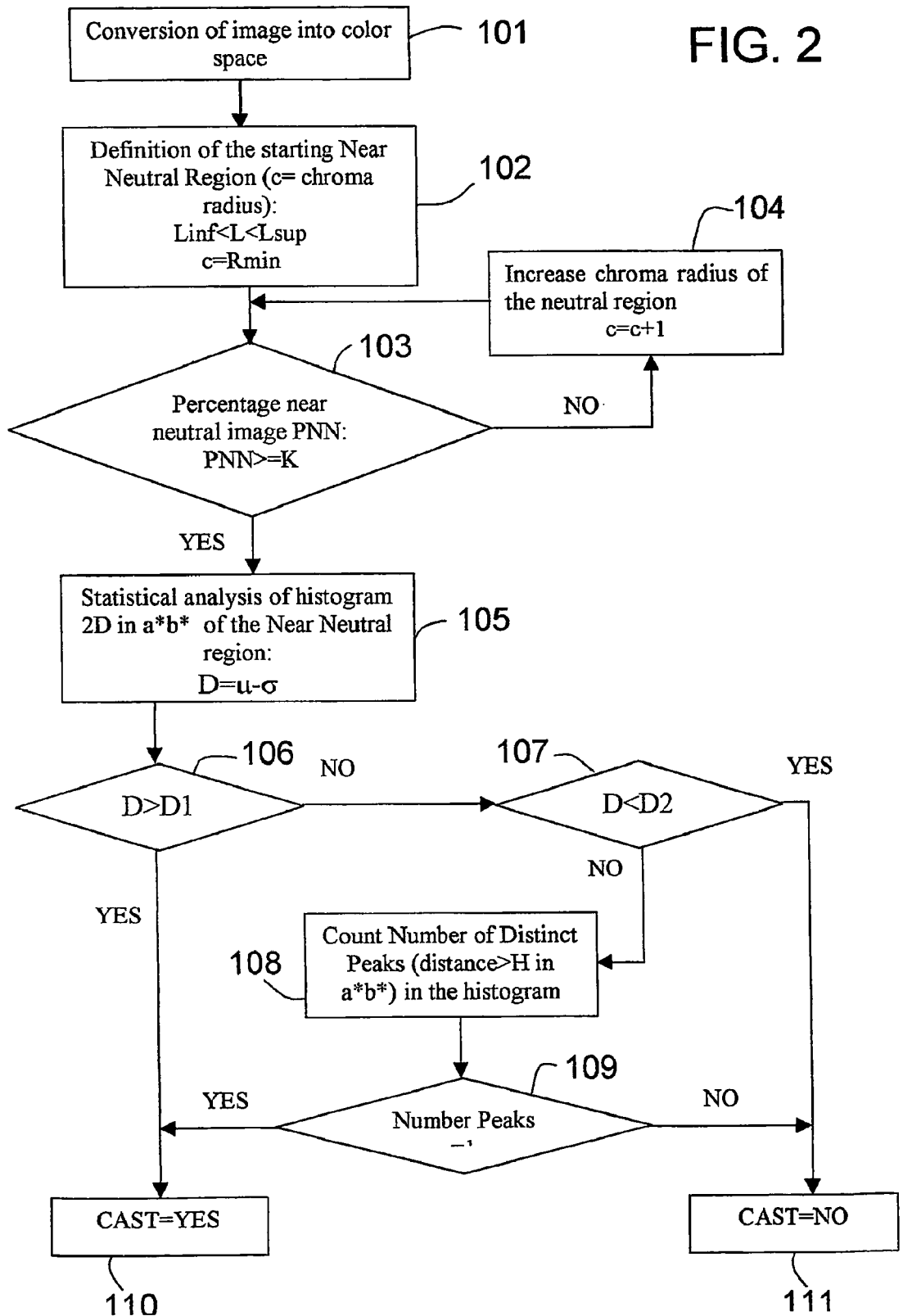
FIG. 2—Represents the flow diagram of the method according to the invention.

The method for detecting a color cast, the subject of this invention, is based on the fact that this cast is most evident in those objects which originally have neutral or near neutral colors. FIG. 2 contains the flow diagram of the method according to the invention; in the first step 101, the image is converted into the color space CIEL*a*b*. From this point forward, we shall use the simplified notation, a and b, to indicate a* and b*.

The near neutral objects region (NNO) to be analyzed is defined in subsequent stages 102, 103 and 104.

The near neutral objects region is characterized by lightness values L ranging between two values, Linf<L<Lsup, sufficient to exclude the extreme values of the total luminosity range of the color space, and by values for a and b concentrated about the neutral axis (axis a=0 and b=0), in correspondence with limited values of the radius of chroma c.

The extreme values of L are excluded because the image acquisition system performs an automatic displacement of the black and white regions towards reference points, to generate more brilliant zones and increase the contrast; in this way, however, the original chromaticity is altered, meaning that the regions that have extreme lightness values L become non-significant and often misleading for the purposes of identifying a superimposed chromatic component.

In step 102, the initial near neutral objects region is defined, by selection of the two values Linf and Lsup, of the starting value for the radius of chroma c=Rmin.

The next step 103 comprises calculation of the percentage of near neutral objects (PNN), which is defined as the ratio between the portion of image contained in the near neutral objects region NNO and the overall image. In order to be significant, the percentage of near neutral objects PNN must be greater than or equal to a minimum value K.

If the percentage of near neutral objects PNN is less than K, the method includes the step 104, where the value of the radius of chroma is increased, for instance by one unit, before returning to the step 103, repeating the process until the percentage of near neutral objects PNN becomes significant, i.e. greater than or equal to K. Depending on the experimental results obtained, values Linf=25 and Lsup=90 for instance, may be used, whereas significant values for the chroma radius Rmin and for the percentage of neutral objects PNN could, for instance, be Rmin=6 and PNN>6%.

In addition, to reduce possible noise, only the dots or pixels that have at least 5 other dots or pixels with the same chromatic characteristics in the 3×3 neighbourhood, are considered to be significant pixels.

Analysis of the near neutral objects starts in the step 105, the aim of which is to detect the presence of a color cast in the image. The step 105 includes statistical analysis of the projection in the plane ab of the color histogram in the near neutral objects region, hereinafter also called NNO histogram.

Figure 3:
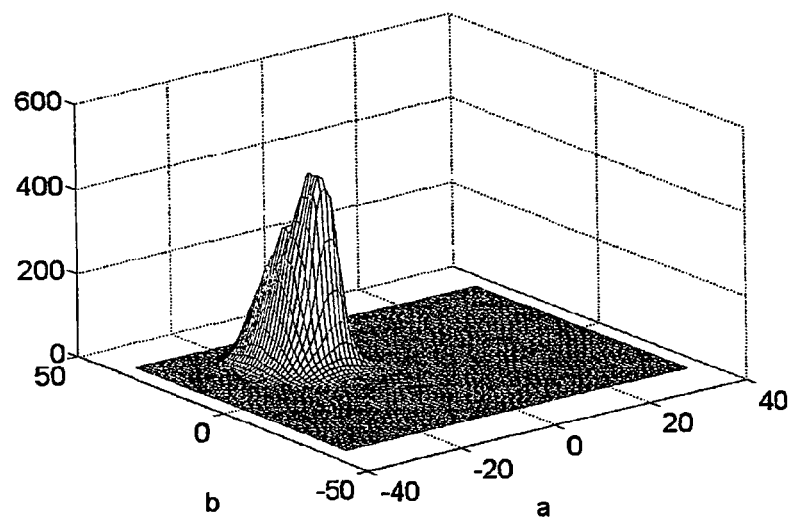
FIG. 3—Represents the histogram of the colors of an original image A.
Figure 4:
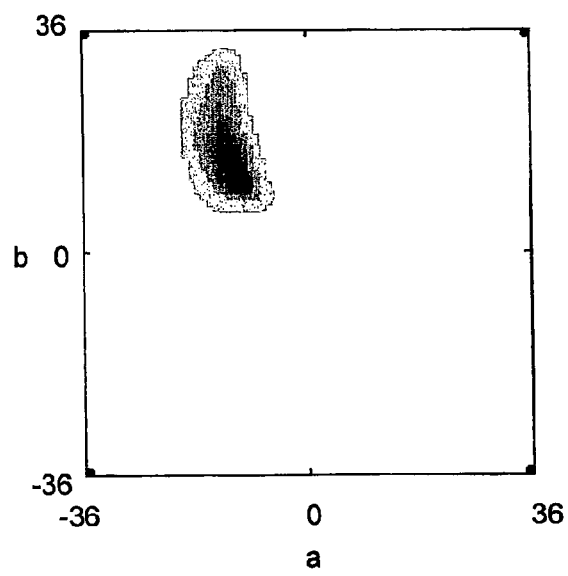
FIG. 4—Represents the projection on the plane ab of the histogram of FIG. 3.
Figure 5:
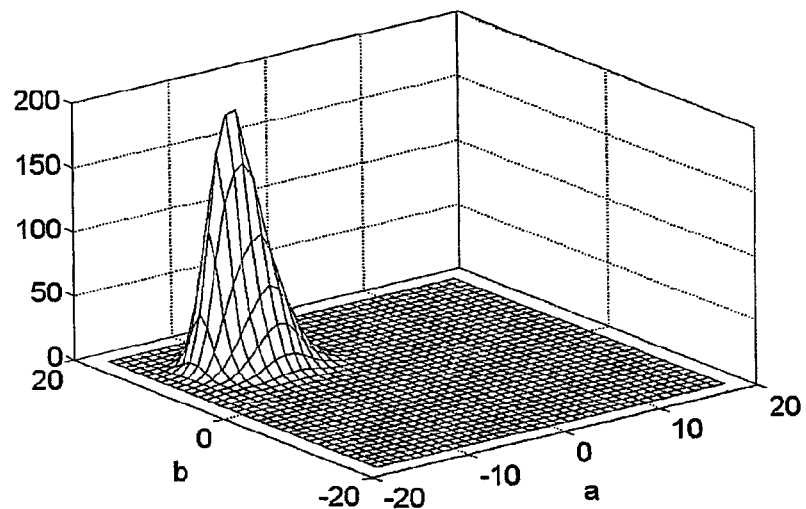
FIG. 5—Represents the histogram of the colors of the near neutral objects of image A.
Figure 6:
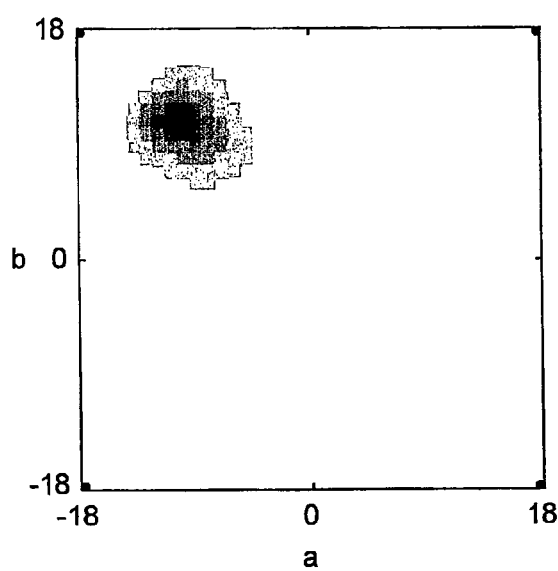
FIG. 6—Represents the projection on the plane ab of the histogram of FIG. 5.

The three-dimensional histogram of the colors of a generic image, in function of the two variables a and b, is constructed by dividing the plane a, b into discrete areas, and reporting on the z axis the number of dots in the image (in the case of digital images, pixels), having chrominance inside the elementary area thus obtained. An example of a histogram of the colors of a generic photographic image A, not depicted in the figures, is shown in FIG. 3, while FIG. 4 is the projection in the plane ab of the same histogram as in FIG. 3. FIG. 5 contains the NNO histogram of the same image A, and FIG. 6 is its projection on the plane ab.

The Near Neutral image is, in this case, approximately 7% of the total image and the radius of chroma, individuated adaptively, is equal to 18.

Figure 7A:
FIG. 7a—Represents an example of projection on the plane ab of the histogram of the colors of the near neutral objects in the case of an image that has a color cast.
Figure 8A:
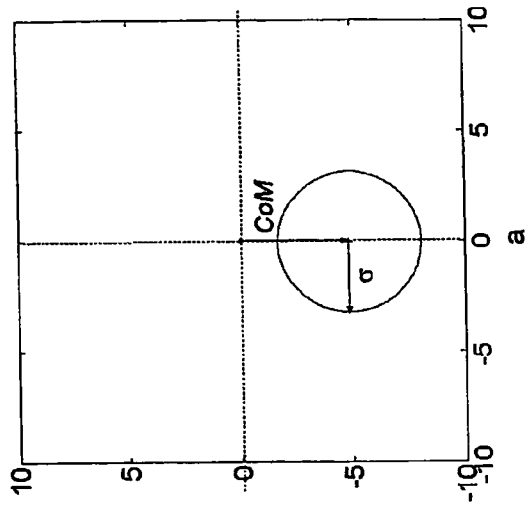
FIG. 8a—Represents an example of projection on the plane ab of the histogram of the colors of the near neutral objects in the case of an image that has a color cast.
Figure 7B:
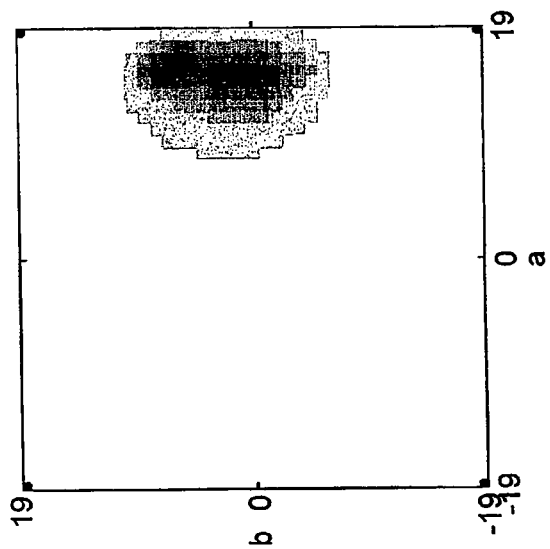
Figure 8B:
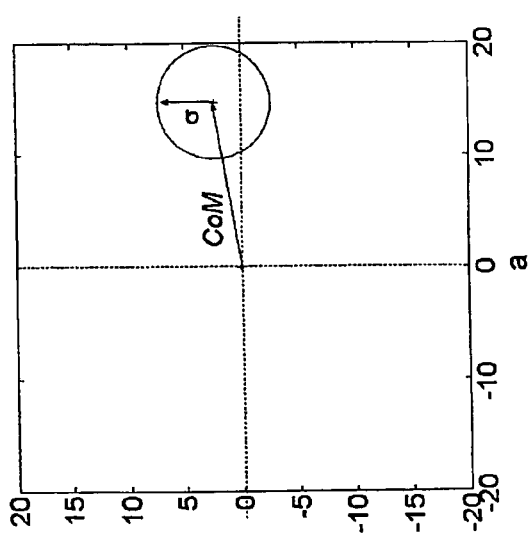
Figure 9A:
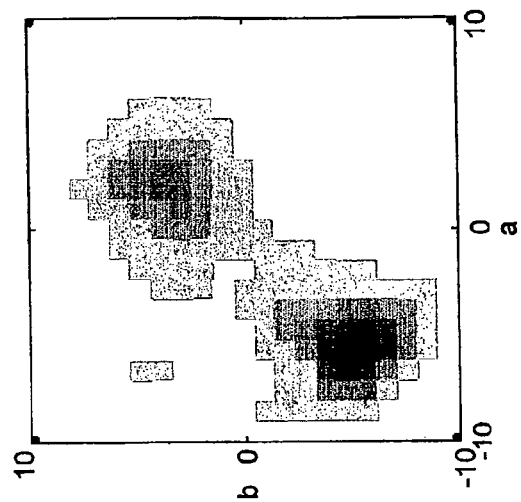
FIG. 9a—Represents an example of projection on the plane ab of the histogram of the colors of the near neutral objects in the case of a neutral image.
Figure 10A:
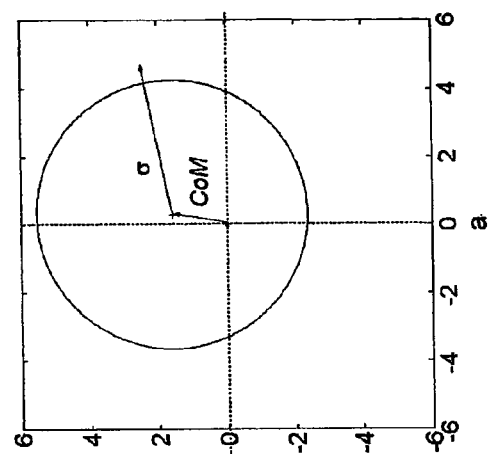
FIG. 10a—Represents an example of projection on the plane ab of the histogram of the colors of the near neutral objects in the case of a neutral image.
Figure 9B:
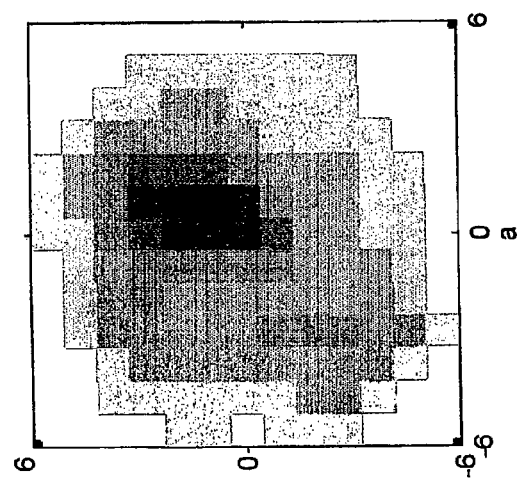
Figure 10B:
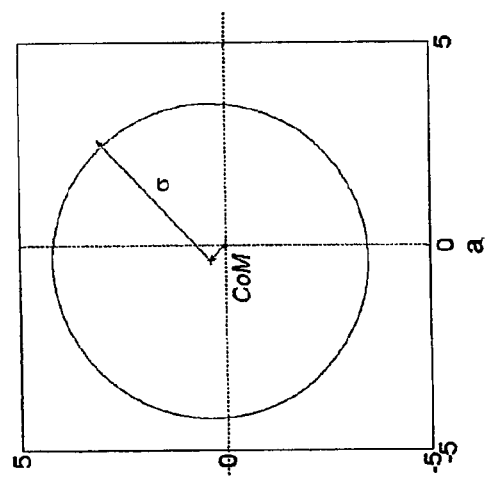

To investigate the near neutral objects, for the purpose of identifying if there is a cast, the shape and position of the projection of their color histogram must be studied on the plane ab, with respect to the neutral axis (a=0, b=0), as indicated in step 105 of FIG. 2. When, in fact, there is a net color cast in the image, the projection of the NNO histogram consists of a single spot, concentrated in a zone relatively far from the neutral axis, as in the example shown in FIG. 6. On the other hand, a neutral image is characterized by a histogram distributed uniformly about the neutral axis, or consisting of numerous clearly distinct spots positioned in the various quadrants. Depicted in FIG. 7a and in FIG. 8a are two non-dubious cases of projections of NNO histograms corresponding to images with cast, whereas FIG. 9a and FIG. 10a represent two NNO histograms corresponding to neutral images.

As is borne out in the examples shown, to be able to detect the presence of a cast, it is therefore necessary to establish the position of the NNO histogram and evaluate amplitude thereof. To do this, the method described in this invention is based on statistical analysis of the distribution of the NNO histogram. If we call H(a,b) the distribution of the color histogram in the chromatic space ab, as an estimate of the probability density function, we may define as follows:

$$F(a, b) = \frac{H(a, b)}{\int_{a,b} H(a, b) da db}$$

where therefore F(a,b) da db represents the probability of a dot of the image (in the case of digital images, a pixel) having chromatic coordinates in the intervals [a a+da], [b b+db].

From this statistical interpretation of the histogram NNO it is possible to assess the mean value μ and the standard deviation σ of the distribution F(a,b) in a and b:

$$\mu_a = \int_a a F(a, b) da;$$

$$\mu_b = \int_b b F(a, b) db;$$

$$\mu = \sqrt{(\mu_a^2 + \mu_b^2)}$$

$$\sigma = \sqrt{\int_a (\mu_a - a)^2 F(a, b) da + \int_b (\mu_b - b)^2 F(a, b) db}$$

The position of the NNO histogram may thus be individuated by its centre of mass, assessed as:

$$\vec{CoM} = \mu_a \cdot \vec{u}_a + \mu_b \cdot \vec{u}_b, \quad |\vec{CoM}| = \mu$$

where $\vec{u}_a, \vec{u}_b$ represent the unit vectors of the axes a b, whereas its distribution is associated with the standard deviation σ. Images with a distinct cast therefore have a fairly high $\vec{CoM}$, and a small standard deviation σ, vice versa neutral images have their centre in the region of the neutral axis and a generally high standard deviation. An equivalent circle with centre in $\vec{CoM}$ and radius σ is now associated with the effective distribution of the NNO histogram. Study of the equivalent circle enables us to establish the chromatic characteristics of the image. If in fact we define the distance D as:

$$D = \mu - \sigma$$

then D>0 will correspond to equivalent circles far from the neutral axis, and therefore cast in the image, whereas D<0 will correspond to the situation in which the neutral axis falls inside the equivalent circle and the image is therefore neutral.

Shown in FIGS. 7b, 8b, 9b and 10b are the equivalent circles corresponding to the 4 images of FIGS. 7a, 8a, 9a and 10a, for which we have respectively: D=9.9, D=1.7, D=−3.37, D=2.32.

Figure 11A:
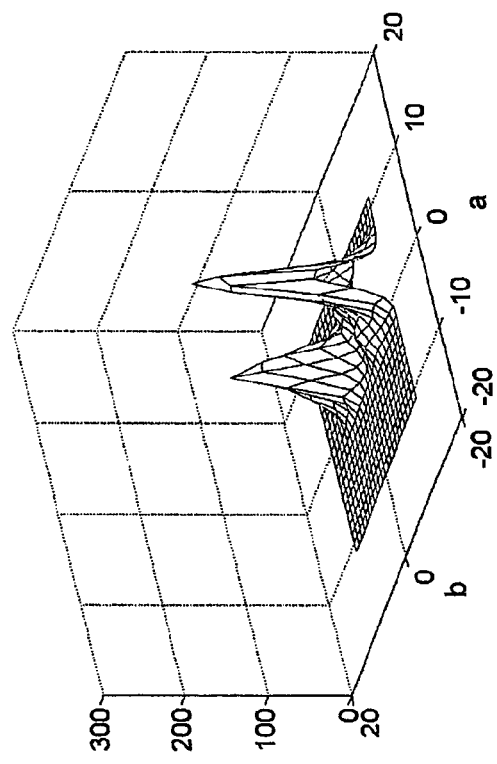
FIG. 11a—Represents an example of a histogram of the colors of the near neutral objects in the event that more than one significant maximum is present.
Figure 11C:
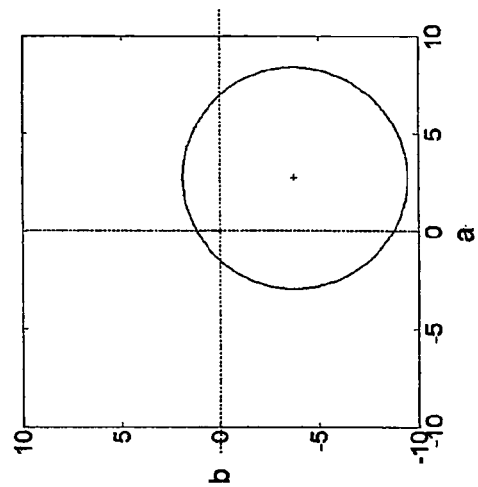
FIG. 11c—Represents the equivalent circle corresponding to the histogram of FIG. 11b.
Figure 11B:
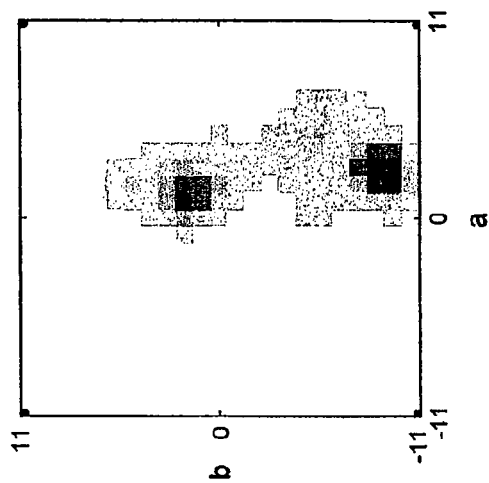
Figure 12A:
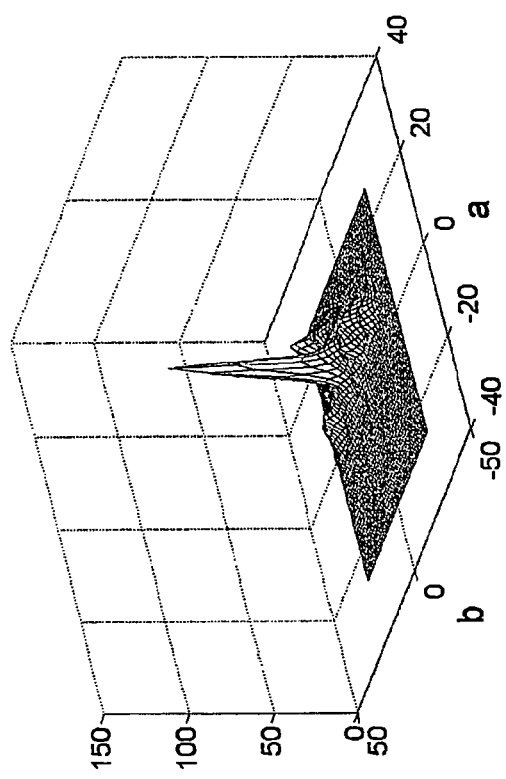
FIG. 12a—Represents an example of the histogram of the colors of the near neutral objects in the event that just one significant maximum is present.
Figure 12C:
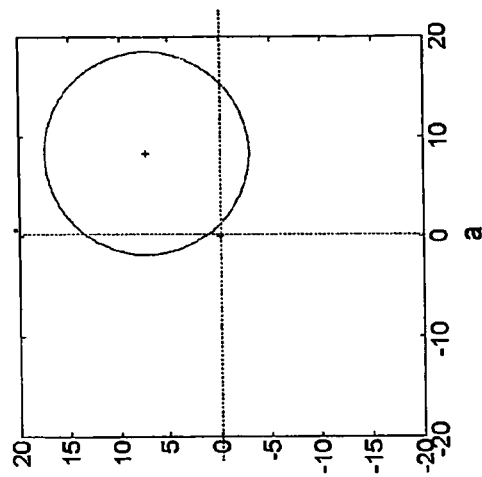
FIG. 12c—Represents the equivalent circle corresponding to the histogram of FIG. 12b.
Figure 12B:
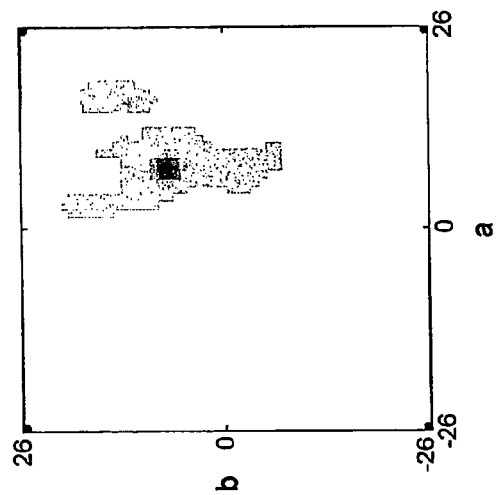

When the distance D is decidedly positive or negative, with D>D1 and D<D2, as indicated in the steps 106 and 107 of FIG. 2, there is no uncertainty in detecting the presence of a cast in the image or its neutrality; however, when D≅0, the case in which the neutral axis is very close to the circumference of the equivalent circle, we are in a situation of uncertainty since slight variations in the parameters of the code, such as for example the noise threshold or the minimum permissible percentage for the NNO, may result in the neutral axis moving out of or into the equivalent circle, generating contradictory interpretations of the nature of the image. In addition, in ambiguous cases where there are neither clearly distinct and distributed spots nor a single spot far from the neutral axis, the equivalent circle is not always a good approximation of the histogram, as may be seen from the examples shown in FIG. 11c and 12c. In these ambiguous cases, which may for instance be defined for values of D between −3 and 1.5, the method that this invention relates to includes a further investigation in which we try to find the distinct maxima of the NNO histogram, namely in which the distance is greater than a minimum value H, for example equal to 8 (step 108 of FIG. 2). For the presence of 2 or more distinct maxima implies the presence or numerous colors and rules out the presence of a cast (step 111 of FIG. 2). On the other hand, the presence of a single maximum implies a cast (step 110 of FIG. 2). FIGS. 11a and 12a illustrate two examples of NNO histograms of initially ambiguous images. After investigation of the maxima of the histogram, the image that the histogram of FIG. 11a corresponds to and its projection in the plane ab represented in FIG. 11b, having two distinct peaks in the histogram, is classified as a neutral image, whereas for the image that the histogram of FIG. 12a and its projection on the plane ab represented in FIG. 12b, having a single significant peak in the histogram, corresponds to, a cast is detected.

The method that this invention relates to has a high computing speed, especially since it allows chromatic analysis of the image to be performed on a significantly reduced specimen of spots with respect to the original image, without losing reliability. Experimental tests carried out have shown that the desired results may be obtained with images reduced to dimensions in the order of 300×300 pixel.

The properties of the method described, in particular reliability of the results, independence of the initial datum type and total lack of knowledge of the characteristics of the objects reproduced in the image, make it a good starting point for numerous applications, such as for example the problem of color reproduction in ink jet printing or in the study of enhancement of images obtained for instance with scanners or digital cameras.

To advantage, this more advanced stage of processing may be based on knowledge of the nature of the image, and be adapted to discriminate between when the color cast is artificial in type or is a natural characteristic of the scene reproduced, and accordingly decide whether to remove it.

The method of the invention may be applied on a peripheral suitable for processing images, for example an ink jet color printer, a photographic printer, or a display unit.

In particular, such a peripheral includes a device operating according to the method of the invention for detecting a color cast and in addition means for correcting the image depending on the color cast detected.

The invention may be produced with a different sequence of the steps described, and in short, without prejudice to the principle of the invention itself, the construction details and the embodiments may be abundantly varied with respect to what has been described and illustrated, without departing from the scope of the invention.

The invention claimed is:

1. Method for detecting a color cast in an image, comprising the following steps:

converting said image into a chromatic space of the type CIEL*a*b*;

defining, inside said chromatic space, a region of the near neutral objects of the image converted into said chromatic space; by setting a given range of lightness values L and by calculating, in successive iterations, a given value of the radius of chroma in such a way that said region of the near neutral objects includes a percentage of the image greater than or equal to about 7%;

determining the mean value and the standard deviation of the distribution, in a plane with L*=constant of said chromatic space, of the color 2-dimensional histogram of said region of the near neutral objects;

analyzing the difference between said mean value and said standard deviation;

detecting said color cast in the event that the difference between said mean value and said standard deviation is greater than a first determined positive value; characterized in that the method further comprises the steps of:

performing a count of the number of distinct peaks of said histogram in the event that the difference between said mean value and said standard deviation is less than said first determined positive value and greater than a second determined negative value; and detecting said color cast in the event that the number of said peaks is equal to one.

2. Method according to claim 1, wherein said color cast is detected in the event that the difference between mean value and standard deviation is greater than 1.5.

3. Method according to claim 1, wherein said count is performed in the event that the difference between mean value and standard deviation is less than 1.5 and greater than −3.

4. Device for detecting a color cast in an image, characterized in that said device implements the method disclosed in claim 1.

5. Peripheral for the management of images, characterized in that the peripheral includes the device, according to claim 4, for detecting a color cast in a generic image, means for correcting said image depending on the color cast detected, and means for processing said image after having corrected it.

6. Peripheral according to claim 5, characterized in that the peripheral is an ink jet printer for high quality printing, such as a photographic type printer.

* * * * *